US008039765B2

(12) United States Patent
Bologa et al.

(10) Patent No.: US 8,039,765 B2
(45) Date of Patent: Oct. 18, 2011

(54) LEADTHROUGH FOR AN ELECTRICAL HIGH VOLTAGE THROUGH A WALL SURROUNDING A PROCESS AREA

(75) Inventors: Andrei Bologa, Karlsruhe (DE); Thomas Wascher, Heidelberg (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 238 days.

(21) Appl. No.: 12/220,666

(22) Filed: Jul. 28, 2008

(65) Prior Publication Data

US 2009/0044974 A1 Feb. 19, 2009

Related U.S. Application Data

(63) Continuation-in-part of application No. PCT/EP03/03816, filed on Apr. 12, 2003.

(30) Foreign Application Priority Data

Jun. 21, 2002 (DE) .................................. 102 27 703

(51) Int. Cl.
*H02G 3/18* (2006.01)

(52) U.S. Cl. ........ 174/668; 174/652; 174/669; 174/135; 439/98; 439/274; 95/60

(58) Field of Classification Search .................. 174/668, 174/652–659, 669, 135, 152 G, 153 G, 151; 439/98, 110, 604, 274; 95/60, 65
See application file for complete search history.

(56) References Cited

U.S. PATENT DOCUMENTS

| | | | | |
|---|---|---|---|---|
| 4,239,505 | A * | 12/1980 | Drnevich | 95/78 |
| 5,421,863 | A * | 6/1995 | Rector et al. | 96/60 |
| 6,239,370 | B1 * | 5/2001 | Loibl et al. | 174/666 |
| 7,615,715 | B2 * | 11/2009 | Hofmann et al. | 174/668 |

* cited by examiner

*Primary Examiner* — Dhirubhai R Patel
(74) *Attorney, Agent, or Firm* — Klaus J. Bach

(57) ABSTRACT

In a leadthrough for an electrical high voltage conductor through a wall which separates a process area from an ambient area, comprising a body of a dielectric high voltage resistant material, two axially adjacent geometric base structures are provided, a cylinder and a truncated cone having a smaller diameter end adjacent the cylinder so that the cylinder has a radial annular surface area adjacent the truncated cone, and the cylinder includes axially extending gas supply bores arranged uniformly distributed over the circumference of the cylinder and having exit openings at the radial annular face of the cylinder such that gas supplied to the gas supply bores at the ambient area end of the cylinder is discharged from the gas supply bores onto the outer surface of the truncated cone to form a gas envelope around the truncated cone.

14 Claims, 6 Drawing Sheets

Fig. 1
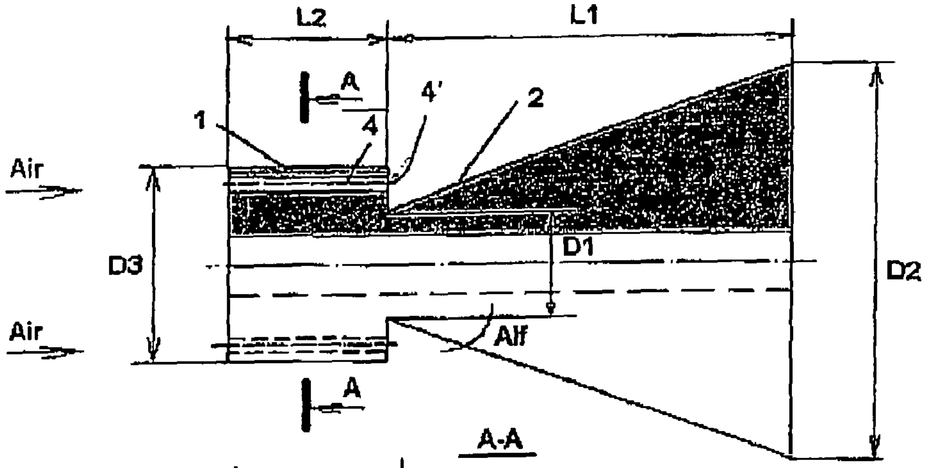
Fig.1a
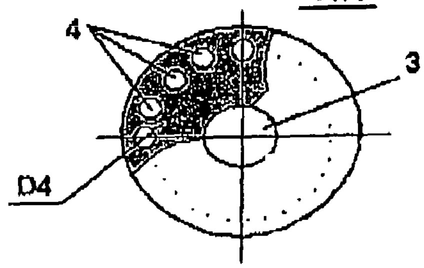
Fig. 2
Fig. 2A
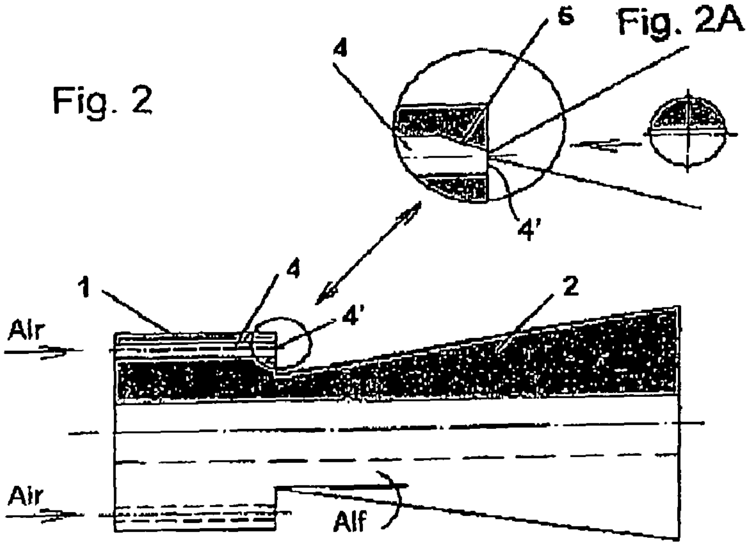

LEADTHROUGH FOR AN ELECTRICAL HIGH VOLTAGE THROUGH A WALL SURROUNDING A PROCESS AREA

This is a Continuation-In-Part Application of international application PCT/EP03/03816 filed Apr. 12, 2003 and claiming the priority of German application 102 27 703.6 filed Jun. 21, 2002.

BACKGROUND OF THE INVENTION

The invention relates to a leadthrough for an electrical high voltage through a wall which separates a process area from an ambient area. The process area has at least in its entrance area an atmosphere which is contaminated by, or includes, liquid droplets (aerosols) and/or carbon or dust particles and which is therefore separated from the environment.

In order to remove such contaminating aerosols or solid particles from the process atmosphere, it is conducted in the process area through cleaning equipment.

Such equipment are for example electrostatic dust collectors or electrostatic wet dust removers. They are generally used for removing contaminants from the air or from gases. The contaminants are removed by being electrostatically charged and then collected on grounded electrodes. To this end, a high electrical voltage must be supplied from a source in the ambient area to the respective high voltage equipment in the process area. Such electrostatic collectors and electrostatically enhanced wet scrubbers remove particles form exhaust gases. In many of the devices developed in the last years, a reduction in size of the devices and increased longtime stability was achieved. Often high voltage leadthroughs extend through the wall or are provided by way of an added structure.

An electrostatic high voltage shield can be used to pre-vent particle deposition on the insulator (see WO 00/30755). In this case, the conductive casing is connected to the same high voltage source as the discharge electrode so that a high voltage electrical field is generated in the area between the casing and the close-by grounded surfaces of the housing. Accordingly, the charged droplets or particles present in the gas are deposited on the grounded surface and not on the high voltage insulators. In order to prevent vapor condensation on the insulators, the insulators are heated since condensation on the insulators could reduce the voltage at the electrical connector. To this end, an electrostatic heater is connected to the insulator in order to maintain it at a temperature of at least 10° C. above the temperature of the surrounding gas. Generally, a few degrees are sufficient to prevent vapor condensation.

The insulators can also be heated by an injection of dry warm cleaning gas into the shield which surrounds the insulators (U.S. Pat. No. 6,156,098 or WO 00/47326. The flow of air around the insulator keeps the surface of the insulator free from moisture and dust deposits so as to keep the insulator clean and generally free from sparking. By the admission of the air by way of a blower or other air pressure generating means to a certain degree air cooling and controlled heating as well as cleaning is provided for in connection with air conditioning in the precipitation device.

U.S. Pat. No. 5,421,863 discloses a self-cleaning venture insulator for an electrostatic precipitator. The insulator consists of a dielectric material into which a spark over can burn only with difficulty. The air flow admitted through a venturi nozzle protects the surface of the insulator from the deposition of impurities from the exhaust gas.

The effectiveness of cleaning the gas depends on a reliable operation of the high voltage supply. Good electrical high voltage insulating materials, which are readily available are important and designs suitable for the ambient area and the process area and particularly the geometries are very important. During operation, the high voltage insulator is exposed to the charged and not charged particles suspended in the gas as well as to the condensed vapors which are possibly present. Over an extended period, the collection of condensed material on the insulator detrimentally affects the insulator. Therefore the insulator must be kept free of impurity deposits so as to avoid sparking. Furthermore, the cleaning intervals must be extended. In addition, the manufacturing costs must be reduced while the insulation properties should be improved.

In this connection, particular attention should be directed to the high voltage leadthrough which is installed in the wall between the ambient and the process area and by way of which the high voltage required for the electrostatic cleaning device can be safely and longtime-reliably provided.

SUMMARY OF THE INVENTION

In a leadthrough for an electrical high voltage conductor through a wall which separates a process area from an ambient area, comprising a body of a dielectric high voltage resistant material, two axially adjacent geometric base structures are provided, a cylinder and a truncated cone having a smaller diameter end adjacent the cylinder so that the cylinder has a radial annular surface area adjacent the truncated cone, and the cylinder includes axially extending gas supply bores arranged uniformly distributed over the circumference of the cylinder and having exit openings at the radial annular face of the cylinder such that gas supplied to the gas supply bores at the ambient area end of the cylinder is discharged from the gas supply bores onto the outer surface of the truncated cone to form a gas envelope around the truncated cone.

With this basic structure consisting of a suitable insulating material safe insulation is provided for the conductor which extends through a central bore and is tightly embedded therein. At the end of the leadthrough, the part exposed in the process area has a geometry which provides for sufficient spacing with respect to other electrical potential areas.

Preferably, with bores which are not centrally arranged, the air flow to the outer surface of the truncated cone can be effectively controlled. The cross-section of these bore is for example not constant over their length, it is larger at the air/gas exit area toward the process area—in order for the air flow to come into contact with the truncated cone already at its end at the cylinder, depending on the distribution of the axial bores over the circumference.

At the exit, the flow cross-section of the bore is only large enough as permitted by the circumferential wall of the truncated cone. It is also effective if an annular groove which is concentric to the axis and has an inner radius equal to the radius of the front end of the truncated cone is provided in the cylinder and these bores end at the radially inner end of the annular groove.

At their exit ends, the bores may be provided with a lip, particularly if the opening angle of the truncated cone is smaller than 20°, so that the air/gas flow is guided by the inclined lip surface toward the axis. Depending on the atmospheric conditions in the process area, it may be important for a safe electrical operation, particularly over an extended period, to expose also the base area of the truncated cone at the cylinder fully to the gas or air flow and to avoid dead areas where the cone is not exposed to any gas flow.

In order to prevent electrical discharges along the surface of the truncated cone in the process area, any exposed edges are rounded. The large front of the truncated cone exposed to the process area is basically planar or funnel-shaped or cone-shaped toward the process area.

If permitted by space restraints, the large front face of the truncated cone may be extended coaxially as a hollow cylinder by a predetermined distance into the process area with an inner passage having a diameter so as to accommodate the electric conductor therein.

The large front face of the truncated cone may be provided with at least one groove of U or V-shaped cross-section and arranged concentrically to the axis in order to increase the electrical resistance thereof. This may also apply to the co-axial hollow-cylindrical extension.

The outer surface of the truncated cone is preferably provided with at least one U or V-shaped annular groove. An axial leakage path along the outer surface would then be meander-shaped so that it is substantially longer. If the edges of the annular grooves are rounded deposits, which may cause electrical problems can easily be washed off.

The recessed connecting area of the truncated cone to the cylinder is effective for insulation and for saving space. To this end, the front end of the cylinder which is exposed to the process area may be provided with a truncated cone-like recess. The truncated cone can then start at the bottom of this recess forming a funnel-like gap with the cylinder face wall. This gap remains constant toward the process area or becomes wider in that direction. The bores arranged in the cylinder about the axis, open in this embodiment at the annular bottom area of the funnel-like gap. As a result, a dead flow area is also avoided.

With a high humidity in the process area, liquid deposits or problematic vapor condensation, the high voltage problems are further reduced if the outer edge of the front end extending into the process is provided at its circumference with an annular lip which forms a channel with the wall. With a horizontal installation of the leadthrough and therefore a vertical arrangement of the ring forming the channel, liquid running down along the wall is guided around the leadthrough and then flows down to lower areas.

Technically more involved is a high voltage leadthrough which is provided with heating means but is considered to be an acceptable solution for difficult process conditions and limited space availability. An electric heating system may include heating rods built, or inserted, into the insulating material or fluid passages extending through the insulating material.

The high voltage leadthrough has certain advantages:

Depending on the modification of the base structure including a cylinder and a truncated cone, the leadthrough may be selected based on environmental conditions in the process area such as an atmosphere which is not sensitive to flashovers where a smooth outer surface of the conical parts would be appropriate or an atmosphere highly susceptible to flash over where the conical part would be provided with annular grooves.

The high voltage leadthrough is usable for example in an exhaust gas including solid particles and liquid droplets.

The high voltage leadthrough is a single body which is manufactured by casting or molding or from a solid body by machining. Both processes can be automated and therefore be performed economically.

The conical part is subjected to an air or gas flow which is discharged from the bores extending through the cylinder and which is conditioned or natural. "Natural" means the simple arrangement wherein the air has normal temperature and moisture content corresponding to that of the ambient air and is supplied to the process area for example by a blower. Conditioned air is air or gas which is cooled or heated for example cooled below the dew point whereby moisture is removed and then again heated and directed into the process area. In this case, the operating period and the cleaning intervals are substantially extended.

Below the invention will be described in greater detail with reference to the accompanying drawings:

BRIEF DESCRIPTION OF THE DRAWINGS

FIG. 1 is an axial cross-sectional view of a high voltage leadthrough,

FIG. 1*a* is a cross-sectional view taken along line A-A of FIG. 1,

FIG. 2 shows a high voltage leadthrough with a small cone angle,

FIG. 2*b* shows enlarged a section of FIG. 2,

FIG. 3*a* shows the discharge area of a gas supply bore enlarged.

DESCRIPTION OF PREFERRED EMBODIMENTS

Figure 3:
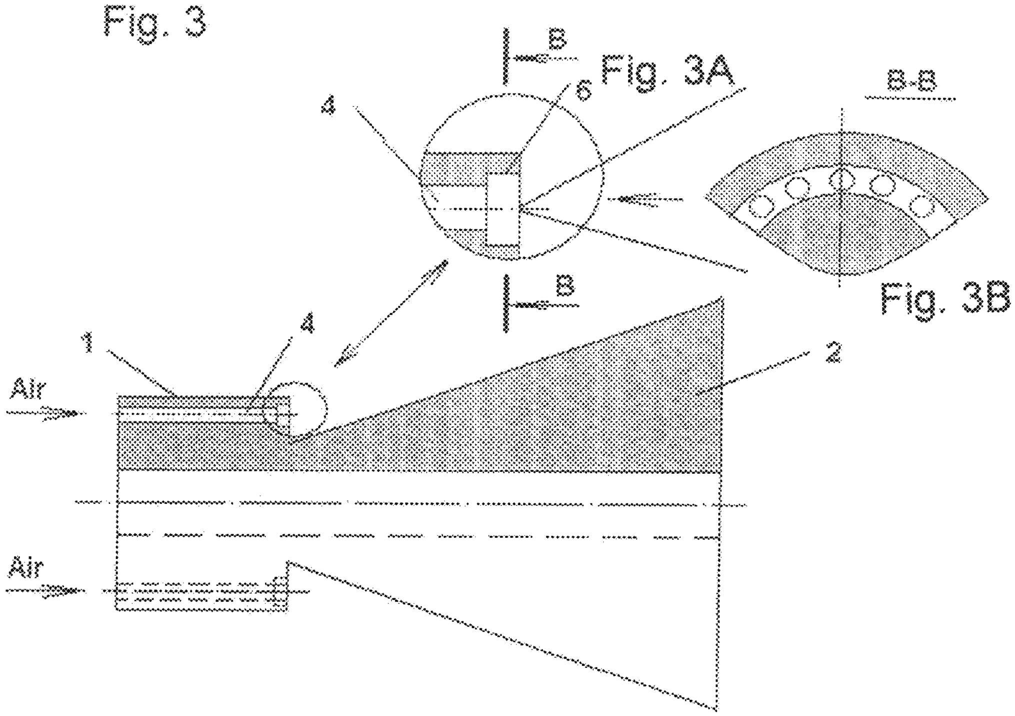
FIG. 3 shows, in a partial axial cross-section, the high voltage leadthrough with the axial air or gas supply bores extending to an annular groove.

A suitable dielectric high voltage and leakage current resistant material of which the body of the high voltage leadthrough may be made, is PTFE (polytetrafluoroethylene). As shown in FIG. 1 in cross-section, the body consists of a cylindrical part 1 and a conical, truncated cone-shaped part 2. The conical part 2 has a front end with a smaller diameter D1 from where the co-axial cylindrical part 1 with a diameter D3 extends. The other free end face of the truncated cone part 2 has a larger diameter D2 and is exposed to the process area. The cylinder part 1 includes axial bores 4, in the shown embodiment 16 bores as indicated in FIG. 1*a*, through which air is conducted onto the truncated cone part 2. The axial bores 4 are arranged evenly spaced circumferentially around a central bore 3 for accommodating an electrical high voltage conductor. The metallic conductor itself is not shown in FIG. 1.

Depending on the surface leakage current the angle $\alpha$ which is half the cone angle of the truncated cone section 2 may vary. It is a determining factor for the size of the leadthrough. Depending on the conditions of the technical process, the mass L1 (height of the truncated cone 2 or, respectively length of the cone 2) and the length L2 of the cylindrical part 1 as well as the diameters D1, D2 and D3 vary. The high voltage leadthrough is adapted to these variables geometrically individually and optimally on the basis of particular applications. With a small opening angle $\alpha \leqq 20°$, the discharge opening areas of the parallel bores 4 to the process area are each provided with a lip 5, as shown in the enlarged view of FIG. 2*a* to provide only a narrow outlet. In this way, the air flow is directed onto the footing of the truncated cone.

In order to avoid dead flow areas at the footing of the truncated cone, the parallel axial bores extending through the cylinder 1 open into an annular groove 6 formed in the front face of the cylindrical part 1 which is exposed to the process area (FIG. 3*a*). The inner radius of the annular groove 6 is at least as large as that of the adjacent end of the truncated cone 2. There the air flows through the parallel bores begin to join and form a homogeneous hollow cylindrical air flow sheet extending over the surface of the truncated cone part 2.

Figure 4:
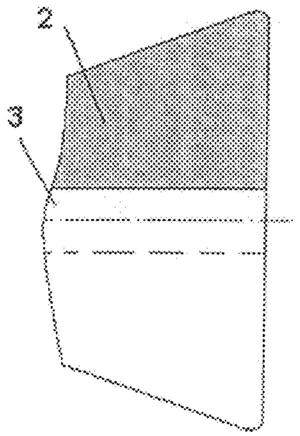
FIG. 4 shows the truncated cone area with a flat front end face and rounded edges.
Figure 5:
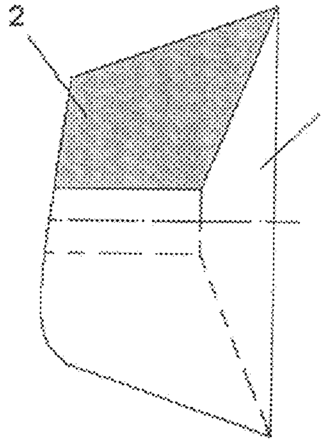
FIG. 5 shows the truncated cone with a funnel-shaped front face.

In order to avoid an influence of the sharp edge at the high voltage leadthrough during operation, the edge area of the circumference of the truncated cone 2 at the free end thereof is rounded (see FIG. 4). In order to increase the sparking distance, the free end face of the truncated cone has a funnel-shape (see FIG. 5). The circumferential edge is shown sharp in FIG. 5, but it may also be rounded as in FIG. 4.

Figure 6A:
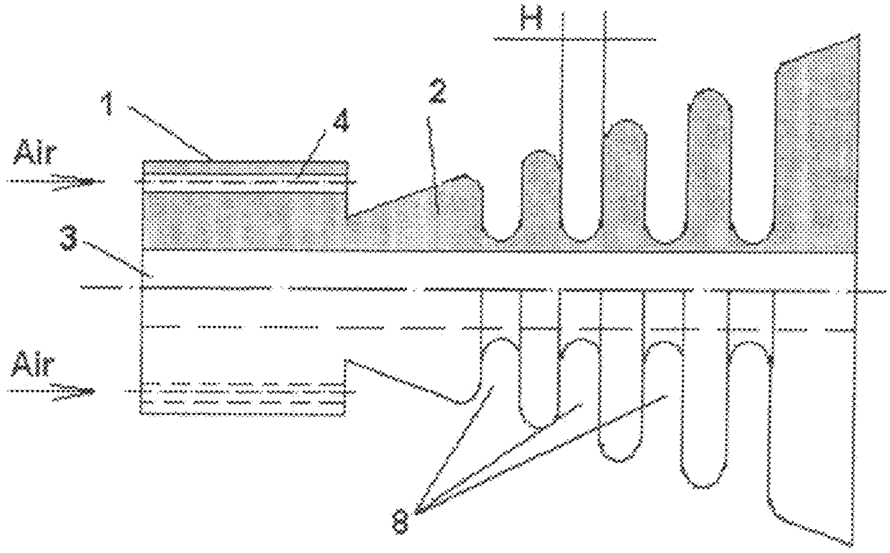
FIGS. 6*a* and 6*b* show a high voltage leadthrough with U-shaped and V-shaped annular grooves.
Figure 6B:
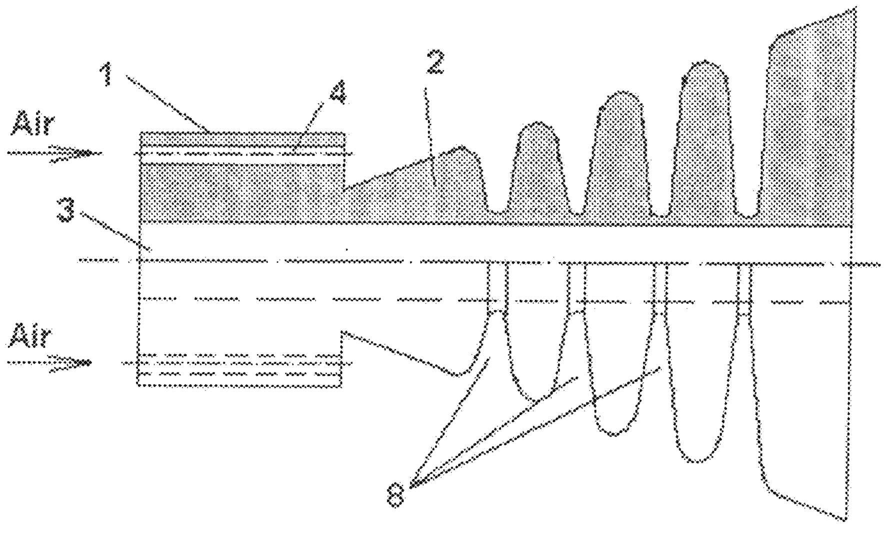

The leak current path must be longer for heavy duty process applications than for less demanding applications. An effective measure is the provision of adjacent concentric annular grooves 8, for example, four adjacent grooves 8 as shown in FIGS. 6*a* and 6*b*. In order to avoid sharp edges all grooves 8 have rounded edge areas. FIG. 6*a* shows U-shaped grooves, FIG. 6*b* shows V-shaped grooves. The grooves may have a constant width H or the width h may increase with the radius. If the high voltage leadthrough is installed in equipment with electrostatically enhanced washers the width H of the grooves 8 is larger than for one installed in a gas flow to be cleaned and including liquid droplets or subjected to the formation of liquid droplets on the surface of the leadthrough. Particularly the annular grooves 8 as shown in FIG. 6*b* reduce the deposition of contaminants on the surface in connection with wet washers since the liquid condensing on the surface flows along the side walls of the annular grooves toward the outer surface of the truncated cone part 2 and, in this way, provides for a self-cleaning effect of the leadthrough.

Figure 7:
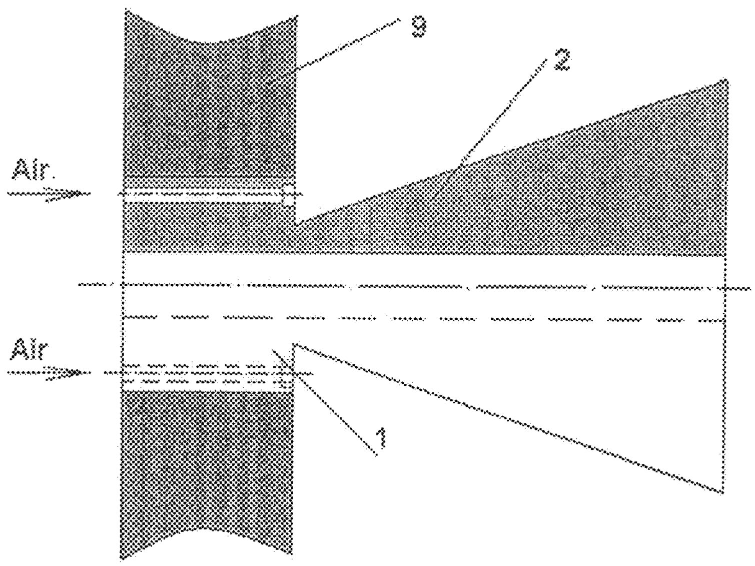
FIG. 7 shows the installation of a high voltage leadthrough in a separating wall.
Figure 8:
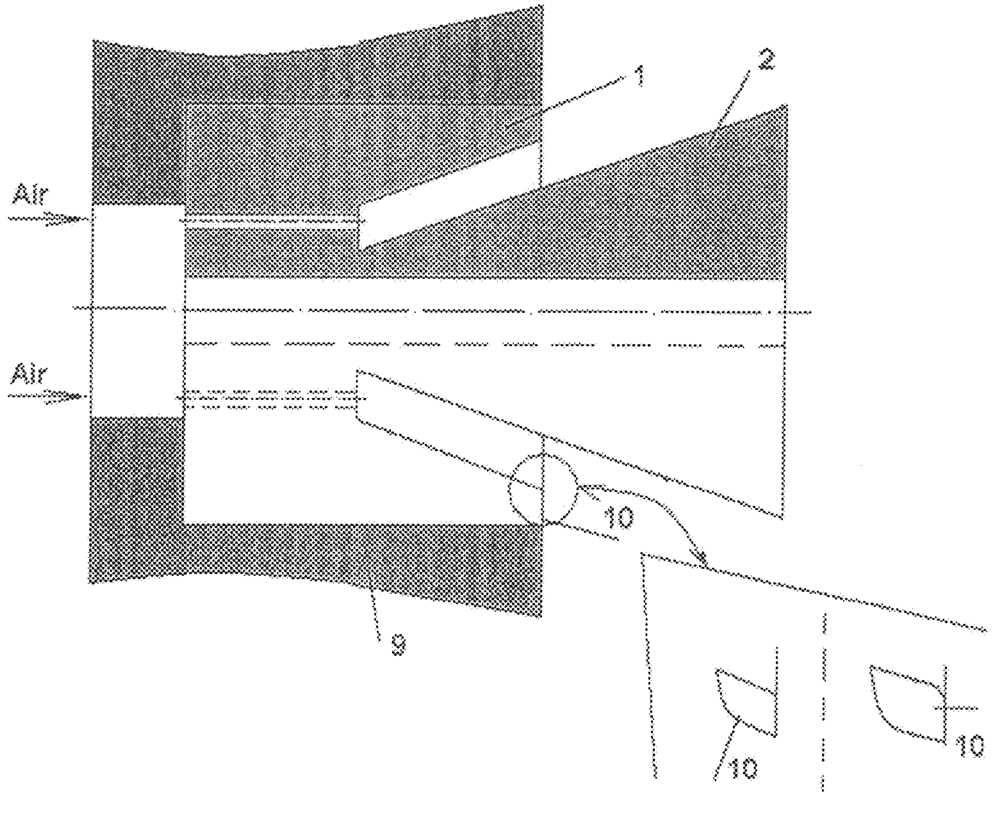
FIG. 8 shows the recessed front face area exposed to the process area of a leadthrough installed in a separating wall.
Figure 9:
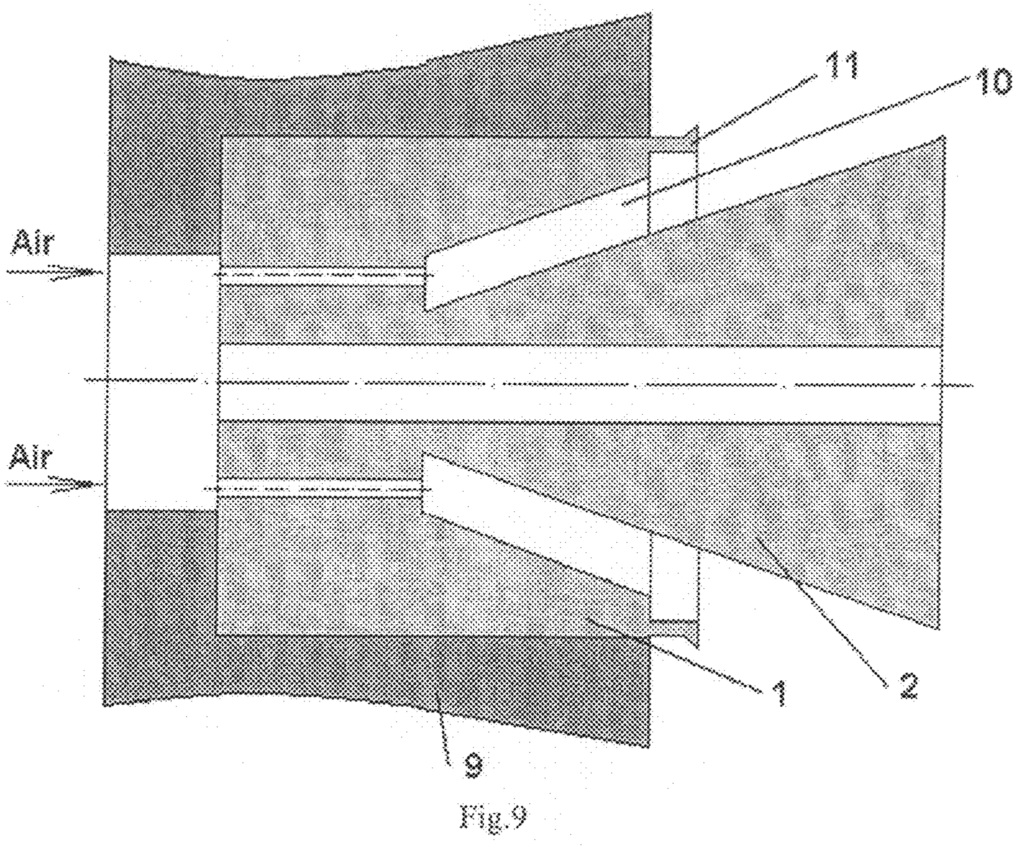
FIG. 9 shows a leadthrough like the one shown in FIG. 8, but including a circumferential channel at its front.

The high voltage leadthrough is installed with its cylindrical part 1 in an opening in the wall 9 between the ambient area and the process area so as to be sealed in the wall 9. This is shown in FIGS. 7, 8, and 9 schematically for various exemplary arrangements. In all cases, the axially parallel bores 4 are totally open so that free passage is provided from the ambient area to the process area.

During the process air is blown from the ambient area through the parallel bores 4 in the cylinder 1 onto the outer surface of the truncated cone 2 so that the deposition of solid or liquid particles thereon from the exhaust gas is prevented. The air or gas which is cold, at ambient temperature or warm, is propelled by a technical device such as a ventilator or a pump (not shown). Preferably, the air or gas is heated above the dew point in the process area to avoid the condensation of liquid on the surfaces of the leadthrough which are disposed in the process area so that the high voltage resistance of the electrical leadthrough is not detrimentally affected.

If, in the process area, the atmospheric pressure is lower than in the ambient area, the air or gas is sucked naturally from the ambient area through the bores 4 into the process area and directed onto the surface of the truncated cone 2. Then no pump or blower is needed to force the air or gas through the bores 4.

If the high voltage leadthrough extends into a process area with high humidity, an overflowing with liquid or water of the leadthrough could occur and cause electrical discharges. In order to avoid such discharges, the concentric annular groove 6 of FIG. 3 may be modified so as to form a deep groove 10 at the end of the cylinder 1 adjacent the process area as shown in FIG. 8. The annular groove 10 has a constant width over its depth and extends so far that the air or gas flow entering there through the bores 4 all over the circumference has such a speed in the groove that any water or liquid is blown out of the groove or its entry into the groove is prevented in the first phase. In this way, discharges can be prevented also under difficult conditions. The circumferential groove 10 is also provided with rounded edges at its end adjacent the process area to prevent discharges (see FIG. 8, enlargement).

If the condensation of water vapors on the inner wall in the process area is very high, a flange ring 11 is provided on the exposed front side of the cylinder 1 in order to guide the water flow along to inner wall around the front face of the cylinder 1 which is exposed to the process area. The flange ring 11 forms with the cylinder and the wall a groove which keeps the liquid off the leadthrough (FIG. 9).

Figure 10:
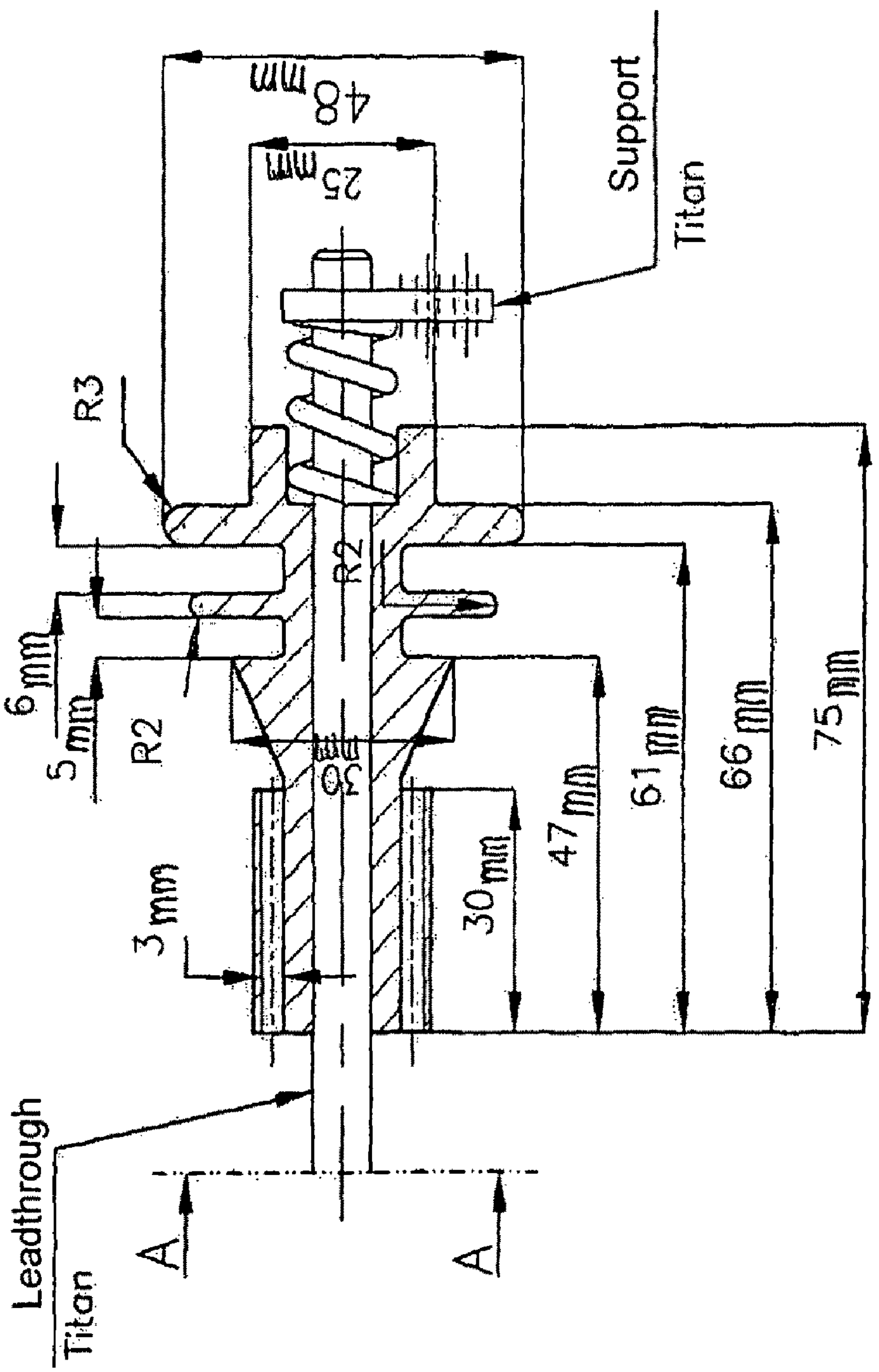
FIG. 10 shows a high voltage leadthrough for 15 kV.

FIG. 10 shows in an exemplary way, the high voltage leadthrough of PTFE with its dimensions for maximally 15 kV with a conductor extending into the process area installed into the insulator. The overall length of the insulator is only 75 mm, the largest diameter is 48 mm. The cylindrical part is sized to fit into a wall which is 30 mm thick. The circumferentially uniformly spaced bores 4 (twelve bores in this case) end with a smooth transition to truncated cone part 2 of the high voltage leadthrough so that its small diameter end is already fully exposed to the air or gas flow through the bores 4. For mechanical, particularly weight reasons, the central conductor consists of titanium. Tests conducted for hours with a water vapor saturated condensing process atmosphere to be cleaned did not cause any electrical discharges at the highest nominal voltage.

What is claimed is:

1. A leadthrough for an electrical high voltage conductor through a wall which separates a process area from an ambient area, comprising: a body of a dielectric high voltage and leak current resistant material including a cylinder (1) having an ambient area end face and a truncated cone (2) having a small diameter end disposed adjacent the cylinder (1) opposite the ambient area end face thereof and a large diameter end face remote from the cylinder (1) with a guide bore (3) extending centrally through the body for accommodating a high voltage conductor, said small diameter end of the truncated cone (2) having a diameter smaller than the cylinder (1) so that the cylinder (1) has a radial annular face area adjacent the truncated cone (2) which, together with the truncated cone (2) is exposed to the process area, said cylinder including axially extending gas supply bores (4) arranged uniformly distributed over the circumference in an annular array and having exit openings (4') in the radial annular open face area of the cylinder (1) directed toward the truncated cone (2) whereby gas supplied to the gas supply bores (4) at the ambient area end face of the cylinder (1) is discharged from the gas supply bores (4) onto the outer surface of the truncated cone (2) to form a gas envelope around the truncated cone (2).

2. A high voltage leadthrough according to claim 1, wherein the gas supply bores (4) have a uniform flow cross-section over most of their length.

3. A high voltage leadthrough according to claim 2, wherein, at the process area end, the gas supply bores (4) are widened but not beyond the radial annular face area of the cylinder (1).

4. A high voltage leadthrough according to claim 3, wherein the large diameter end face of the truncated cone (2) has a rounded radially outer circumferential edge.

5. A high voltage leadthrough according to claim 2, wherein the gas supply bores (4) are provided at their exit toward the process area with lips (5) inclined toward the axis of the body of dielectric material for directing the gas flow onto the truncated cone 2.

6. A high voltage leadthrough according to claim 3, wherein the large diameter end face of the truncated cone (2) which is exposed to the process area is planar or slightly funnel-shaped.

7. A high voltage leadthrough according to claim 6, wherein the truncated cone (2) extends into the process area from the cylinder (1) for a predetermined length with the guide bore (3) for the high voltage conductor extending through the truncated cone (2) so that a conductor inserted into the guide bore (3) extends from the insulator body remote from the wall which separates the process area and the ambient area.

8. A high voltage leadthrough according to claim 7, wherein an annular groove is formed into the radial annular open face area of the cylinder (1).

9. A high voltage leadthrough according to claim 7, wherein an annular groove extends axially into the large diameter end face of the truncated cone (2).

10. A high voltage leadthrough according to claim 6, wherein the truncated cone (2) is provided with at least one annular groove (8) with U- or V-shaped cross-section.

11. A high voltage leadthrough according to claim 10, wherein the edges of the annular grooves are rounded.

12. A high voltage leadthrough according to claim 1, wherein the cylinder (1) is provided with a truncated cone-shaped annular recess (10) at the face area of the cylinder (1) at the inner end of said truncated cone-shaped recess, said annular recess having a uniform width and said guide bores (4) opening into said annular recess (10).

13. A high voltage leadthrough according to claim 12, wherein an annular lip (11) is provided on an outer edge of the cylinder at the process area end thereof so as to form with the wall separating the process area from the ambient area a groove channeling water running down the wall around the leadthrough.

14. A high voltage leadthrough according to claim 13, wherein the dielectric body includes heating means for maintaining the leadthrough at a predetermined temperature.

* * * * *